United States Patent
Abraham et al.

(10) Patent No.: US 12,539,424 B2
(45) Date of Patent: Feb. 3, 2026

(54) SHORT PULSE WIDTH SYSTEMS AND METHODS FOR DEEP BRAIN STIMULATION

(71) Applicant: Medtronic, Inc., Minneapolis, MN (US)

(72) Inventors: Timothy R. Abraham, Lino Lakes, MN (US); Nathan A. Torgerson, Andover, MN (US); Scott R. Stanslaski, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 556 days.

(21) Appl. No.: 17/652,192

(22) Filed: Feb. 23, 2022

(65) Prior Publication Data

US 2022/0266035 A1    Aug. 25, 2022

Related U.S. Application Data

(60) Provisional application No. 63/153,336, filed on Feb. 24, 2021.

(51) Int. Cl.
*A61N 1/05* (2006.01)
*A61N 1/372* (2006.01)
*G01R 19/165* (2006.01)
*G01R 27/16* (2006.01)

(52) U.S. Cl.
CPC .............. *A61N 1/372* (2013.01); *A61N 1/05* (2013.01); *G01R 19/16576* (2013.01); *G01R 27/16* (2013.01)

(58) Field of Classification Search
CPC .... A61N 1/372; A61N 1/05; G01R 19/16576; G01R 27/16

USPC .......................................................... 607/63
See application file for complete search history.

(56) References Cited

U.S. PATENT DOCUMENTS

| 7,937,158 | B2* | 5/2011 | Erickson | A61N 1/37247 607/59 |
|---|---|---|---|---|
| 8,195,294 | B2 | 6/2012 | Goetz et al. | |
| 2002/0123773 | A1* | 9/2002 | Molin | A61N 1/3706 607/27 |
| 2009/0276007 | A1* | 11/2009 | Goetz | A61N 1/36185 607/59 |
| 2013/0013038 | A1* | 1/2013 | Miller | A61N 1/0587 607/116 |

(Continued)

FOREIGN PATENT DOCUMENTS

WO    WO 2009/134463 A1    11/2009

OTHER PUBLICATIONS

The Editors of Encyclopaedia Britannica, "electrical impedance" 1998, Encyclopedia Britannica (Year: 1998).*

*Primary Examiner* — Nicole F Johnson
(74) *Attorney, Agent, or Firm* — Husch Blackwell LLP

(57) ABSTRACT

A stimulation engine configured to identify a fault condition in an implantable lead, including a regulator configured to deliver an electrical pulse between at least two electrodes of the implantable stimulation lead, and a sensing module configured to detect at least an initial voltage and a subsequent voltage between the at least two electrodes at different times during delivery of the electrical pulse, and compare at least the subsequent voltage to a defined threshold value representing an expected voltage at the same time during the electrical pulse to determine the presence of a fault condition.

13 Claims, 5 Drawing Sheets

(56) References Cited

U.S. PATENT DOCUMENTS

2018/0071514 A1* 3/2018 Wagenbach ............ A61N 1/025
2020/0305744 A1* 10/2020 Weerakoon ........ A61N 1/36062
2020/0306550 A1* 10/2020 DeShazo .............. A61B 5/4836

* cited by examiner

SHORT PULSE WIDTH SYSTEMS AND METHODS FOR DEEP BRAIN STIMULATION

CROSS-REFERENCE TO RELATED APPLICATIONS

This application claims the benefit of U.S. Provisional Application No. 63/153,336, filed Feb. 24, 2021 the contents of which are fully incorporated herein by reference

FIELD

The present technology relates generally to controllers, systems and methods for implantable medical devices and, more particularly, to such controllers, systems and methods for implantable medical devices having therapeutic electrodes.

BACKGROUND

The medical device industry produces a wide variety of electronic devices for treating patient medical conditions. Depending upon the medical condition, medical devices can be surgically implanted or connected externally to the patient receiving treatment. Medical professionals or other clinicians use medical devices alone or in combination with drug therapies and surgery to treat patient medical conditions. For some medical conditions, medical devices provide the best, and sometimes the only, therapy to restore an individual to a more healthful condition and a fuller life. Examples of implantable medical devices designed to deliver therapeutic electrical stimulation include a variety of nerve stimulators or neuromodulation devices, cardiac pacemakers and implantable cardioverter-defibrillators among others.

Implantable medical devices configured to deliver therapeutic electrical stimulation commonly deliver therapy via electrodes positioned on one or more leads operatively connected to the implantable medical device. In some instances, the housing of the implantable medical device may also serve as an electrode or an electrode may be positioned on the housing. The electrode or electrodes are commonly positioned in the patient's body during the same surgical procedure in which the implantable medical device is implanted.

The positioning of electrodes and associated leads of implantable medical devices is often an inexact procedure and may commonly be dependent on the particular physiologic characteristics of the patient or expertise of the surgeon. In addition, electrodes may commonly be positioned within the patient without the medical professional or user conducting the procedure being capable of actually seeing where the electrodes are positioned. Instead, external aides such as fluoroscopes and/or endoscopes may commonly be employed to inform the medical professional or other user as to an approximate location of the electrodes.

Due to the inherent uncertainty involved in the placement of electrodes for an implantable medical device, implantable medical devices and the external controllers that interface with the devices are commonly operable to perform a test on the leads and electrodes to verify that the leads and electrodes are functioning properly and are positioned correctly. A common test is to check the impedance between pairs of electrodes. During testing, an electrode can be driven with a signal having known electrical characteristics. The signal may be measured, e.g., on another electrode, and the impedance computed between electrodes using known fundamental relationships. The measured impedance value can give a medical professional or other user information relating to whether the electrodes involved in the test are positioned correctly and operating properly, or provide information about the characteristics of the electrode-tissue interface of the system.

SUMMARY

The techniques of this disclosure generally relate to sensing characteristics of systems having wires or electrodes. There may be particular advantages to using the systems and methods described herein for systems having small wires or electrodes. In one aspect, the present disclosure provides systems and methods for determining whether leads are broken, damaged, or in improper contact with tissue they are intended to treat. In another aspect, the disclosure provides systems and methods for determining resistive and capacitive or reactive components of the overall impedance of a system.

One embodiment of the present disclosure provides a stimulation engine configured to identify a fault condition in an implantable lead, the stimulation engine including a regulator configured to deliver an electrical pulse between at least two electrodes of the implantable stimulation lead, and a sensing module configured to detect at least an initial voltage and a subsequent voltage between the at least two electrodes at different times during delivery of the electrical pulse, and compare at least the subsequent voltage to a defined threshold value representing an expected voltage at the same time during the electrical pulse to determine the presence of a fault condition.

In one embodiment, the electrical pulse is in the form of a square wave. In one embodiment, the stimulation engine is further configured to analyze a total impedance of the implantable stimulation lead, including a resistive component and a reactive component. In one embodiment, a timing of the detection of the initial voltage and the subsequent voltage are coordinated to determine a voltage wave shape over the electrical pulse delivery, wherein the voltage wave shape is indicative of a resistive component and a reactive component of a total impedance of the implantable stimulation lead.

In one embodiment, the stimulation engine is configured to detect a first voltage prior to delivery of the electrical pulse, and a second voltage after delivery of the electrical pulse, wherein a rate of change between the first voltage and the second voltage is indicative of a resistive component of a total impedance of the implantable stimulation lead. In one embodiment, the stimulation engine is further configured to detect at least a third voltage during delivery of the electrical pulse, wherein a rate of change between the second voltage and the third voltage is indicative of a reactive component of the total impedance of the implantable stimulation lead. In one embodiment, the stimulation engine is further configured to detect at least a fourth voltage after cessation of delivery of the electrical pulse, wherein the fourth voltage is indicative of a reactive component of the total impedance of the implantable stimulation lead.

Another embodiment of the present disclosure provides a n medical device, including a stimulation engine, and an implantable stimulation lead including at least two electrodes in electrical communication with the stimulation engine, wherein the stimulation engine is configured to deliver an electrical pulse to the at least two electrodes, detect at least an initial voltage and a subsequent voltage between the at least two electrodes at different times during delivery of the electrical pulse, and compare at least the subsequent voltage to a defined threshold value representing an expected voltage at the same time during the electrical pulse to determine the presence of a fault condition.

In one embodiment, the electrical pulse delivered by the stimulation engine is in the form of a square wave. In one embodiment, the stimulation engine includes a sensing module configured to detect and characterize a total impedance of the implantable stimulation lead. In one embodiment, a detected voltage less than the defined threshold is indicative of at least one of a broken, damaged or improperly positioned implantable stimulation lead. In one embodiment, the stimulation engine is configured to obtain multiple voltage measurements at different times during a single electrical pulse delivery cycle.

In one embodiment, a timing of each voltage measurement is coordinated to determine a voltage wave shape over the electrical pulse delivery cycle. In one embodiment, characteristics of the wave shape are used to determine a resistive component and a reactive component of the implantable stimulation lead. In one embodiment, characteristics of the wave shape are used to evaluate at least one of an electrode-tissue interface, compromised electrical insulation of the implantable stimulation lead, or power supply limitations. In one embodiment, the stimulation engine is configured to analyze a total impedance of the implantable stimulation lead, including a resistive component and a reactive component.

In one embodiment, the stimulation engine is configured to detect a first voltage prior to delivery of the electrical pulse, and a second voltage after delivery of the electrical pulse, wherein a rate of change between the first voltage and the second voltage is indicative of a resistive component of a total impedance of the implantable stimulation lead. In one embodiment, the stimulation engine is further configured to detect at least a third voltage during delivery of the electrical pulse, wherein a rate of change between the second voltage and the third voltage is indicative of a reactive component of the total impedance of the implantable stimulation lead. In one embodiment, the stimulation engine is further configured to detect at least a fourth voltage after cessation of delivery of the electrical pulse, wherein the fourth voltage is indicative of a reactive component of the total impedance of the implantable stimulation lead.

Another embodiment of the present disclosure provides a method of identifying a fault condition in an implantable lead, including delivering an electrical pulse between at least two electrodes of an implantable stimulation lead, detecting at least an initial voltage and a subsequent voltage between the at least two electrodes at different times during delivery of the electrical pulse, and comparing at least the subsequent voltage to a defined threshold value representing an expected voltage at the same time during the electrical pulse to determine the presence of a fault condition.

In one embodiment, the electrical pulse is in the form of a square wave. In one embodiment, the method further includes analyzing a total impedance of the implantable stimulation lead, including a resistive component and a reactive component. In one embodiment, wherein a timing of the detection of the initial voltage and the subsequent voltage are coordinated to determine a voltage wave shape over the electrical pulse delivery, wherein the voltage wave shape is indicative of a resistive component and a reactive component of a total impedance of the implantable stimulation lead. In one embodiment, the stimulation engine is configured to detect a first voltage prior to delivery of the electrical pulse, and a second voltage after delivery of the electrical pulse, wherein a rate of change between the first voltage and the second voltage is indicative of a resistive component of a total impedance of the implantable stimulation lead. In one embodiment, the stimulation engine is further configured to detect at least a third voltage during delivery of the electrical pulse, wherein a rate of change between the second voltage and the third voltage is indicative of a reactive component of the total impedance of the implantable stimulation lead. In one embodiment, the stimulation engine is further configured to detect at least a fourth voltage after cessation of delivery of the electrical pulse, wherein the fourth voltage is indicative of a reactive component of the total impedance of the implantable stimulation lead.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The disclosure can be more completely understood in consideration of the following detailed description of various embodiments of the disclosure, in connection with the accompanying drawings, in which.

Figure 1A:
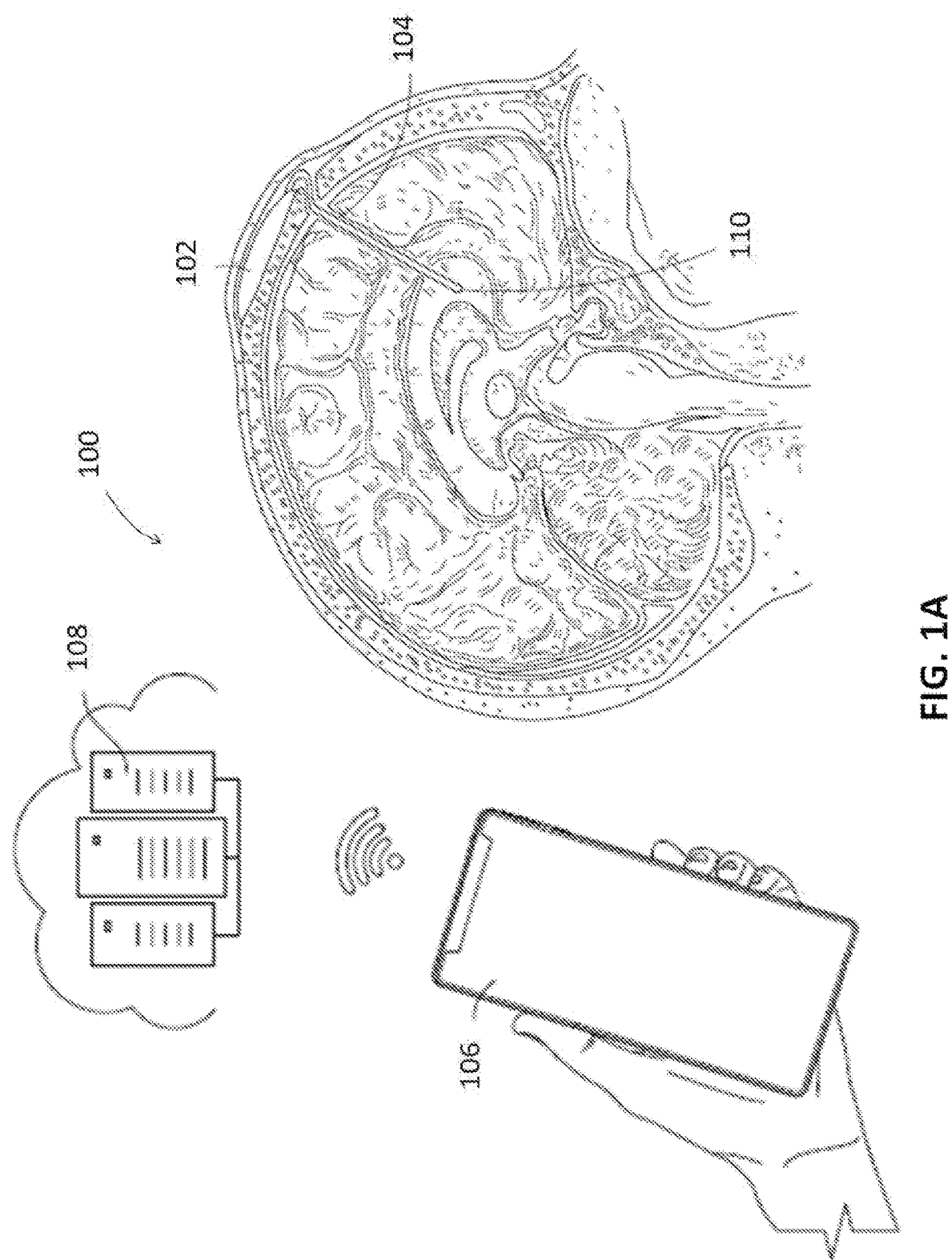
FIG. 1A is a schematic view depicting a neurostimulation system configured to deliver electrical stimulation therapy, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Implantable medical devices can be used to deliver electrical therapies or neurostimulation in a variety of context. In various systems, electrodes can be used to deliver pulses at desired frequencies, voltages, or currents to affect desired outcomes. In the case of deep brain stimulation, for example, electrodes within the brain can be powered at a periodic frequency that regulates abnormal impulses. Deep brain stimulation can be used to treat a number of conditions such as epilepsy, tremors, and Parkinson's disease, among others.

In deep brain stimulation, the electronic signature of the pulses is conventionally controlled by a regulator coupled with a power supply such as a battery. It is generally preferred to put the least number of physical structures possible within the brain. To accomplish this, the power supply can be located at a distance from the electrodes themselves and connected thereto with wires referred to as leads. The electrodes themselves should desirably be as small as possible while being positioned in a location where they can regulate brain function.

Design of deep brain stimulation devices therefore requires consideration of several often countervailing factors, such as minimizing electrode and lead size while maintaining good electrical contact with the brain and preventing lead wire breakage. Furthermore, deep brain stimulation can use relatively short pulse widths, on the order of 80 µs, for some treatments.

Various example embodiments of neuromodulation or neurostimulation devices and systems are described herein for electrical nerve stimulation delivered to a subject. Although specific examples of deep brain neuromodulation are provided, it is to be appreciated that the concepts disclosed herein are extendable to other types of neurosimulation devices. Further, while the treatment of conditions such as epilepsy, tremors, and Parkinson's disease are provided as example therapy regimens, embodiments of the present disclosure can be used to treat a host of other bodily disorders including, but not limited to, reducing the pain signals going to the spinal cord and brain as an aid in relieving pain and relaxing muscles, stimulating the production of endorphins, addressing one or more involuntary functions (e.g., erectile dysfunction, urinary or fecal incontinence, etc.), among other conditions.

It also to be appreciated that the term "clinician" refers to any individual that can prescribe and/or program neuromodulation with any of the example embodiments described herein or alternative combinations thereof. Similarly, the term "patient" or "subject," as used herein, is to be understood to refer to an individual or object in which the neuromodulation therapy is to occur, whether human, animal, or inanimate. Various descriptions are made herein, for the sake of convenience, with respect to the procedures being performed by a clinician on a patient or subject (the involved parties collectively referred to as a "user" or "users") while the disclosure is not limited in this respect.

FIG. 1A schematically illustrates an example of a neuromodulation system 100 adapted for deep brain stimulation. Neuromodulation system 100 includes an implanted neurostimulator device 102, connected to an implantable stimulation lead 104 extending into a brain of the patient; although other types of neurostimulator devices and stimulation leads, such as pacemakers and defibrillators, are contemplated. The stimulation lead 104 can have a variety of shapes, can be a variety of sizes, and can be made of a variety of materials, which size, shape, and materials can be tailored to the specific treatment application. The electrical pulses generated by the neuromodulation system 100 are delivered via one or more stimulation electrodes 110 at or near a distal portion of the stimulation lead 104. In other embodiments, neurostimulator device 102 may be leadless, having one or more electrodes on or otherwise coupled to a housing of neurostimulator device 102.

In some embodiments, the neuromodulation system 100, can further include an external programmer 106 configured to wirelessly communicate with both the neurostimulator device 102 and an optional external server 108. For example, in some embodiments, the external programmer 106 can be configured to transmit programming data or instructions to the neurostimulator device 102. In some embodiments, the external programmer 106 can be configured to receive data (e.g., therapeutic delivery data, efficacy data, etc.) from the neurostimulator device 102. Although the external programming device 106 is depicted as a mobile computing platform (e.g., cellular telephone), other types of external programming devices, such as a desktop computer, tablet, smart watch or other wearable device, or dedicated programming platform are also contemplated. In some embodiments, the external programming device 106 may alternatively be referred to as at least one of a "clinician programmer" or "patient programmer."

In some embodiments, data communicated between the external programming device 106 and neurostimulator device 102 can be transmitted to the external server 108 for wider dissemination, analysis and longer-term storage. In some embodiments, the external server 108 can be configured as a network of servers and/or a computing cloud. For example, in some embodiments, the external server 108 can include one or more complex algorithms representing machine learning and/or a neural network configured to process and analyze neurostimulator device 102 data in an effort to further improve patient outcomes.

Figure 1B:
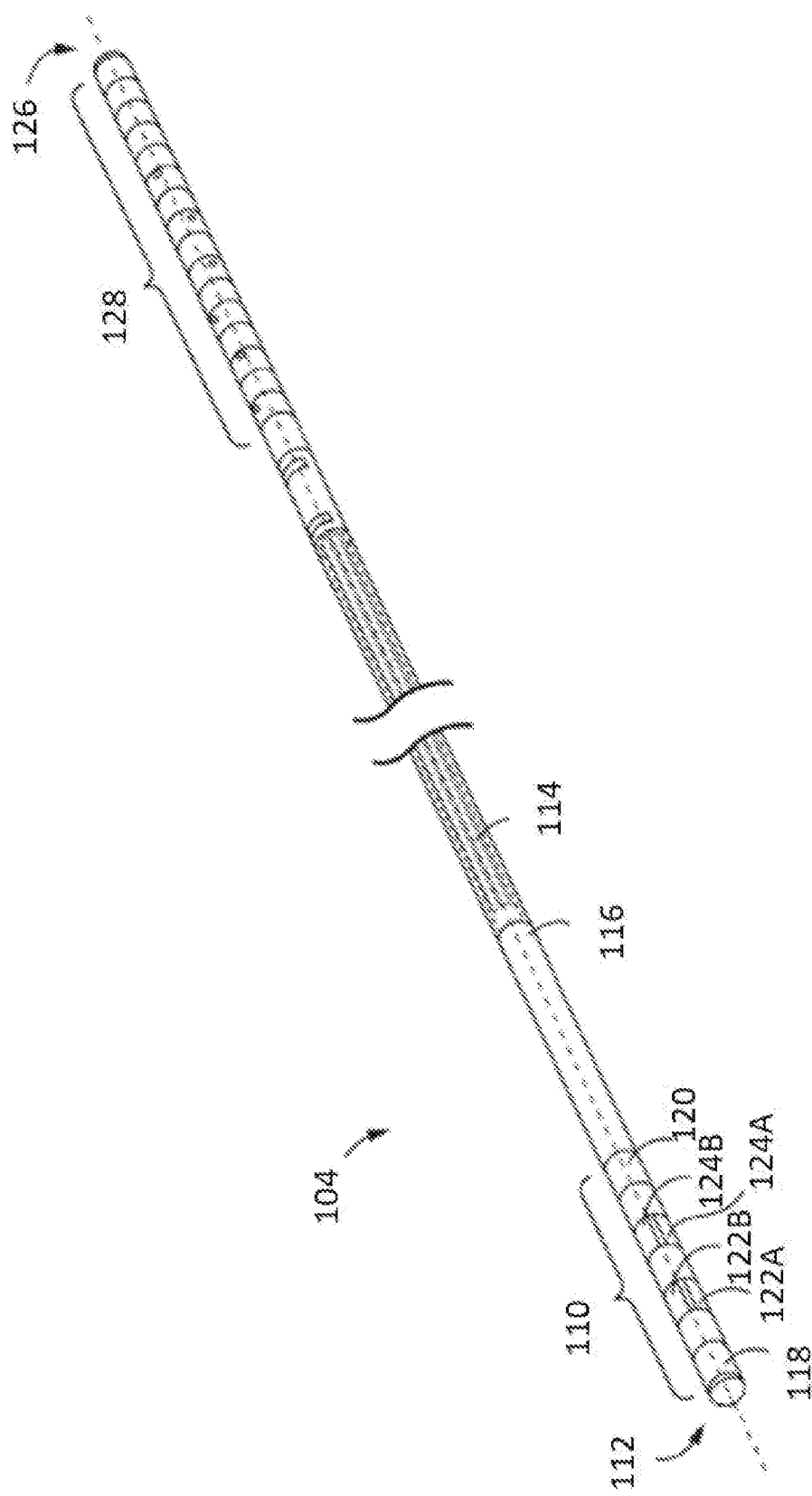
FIG. 1B is a perspective view depicting an implantable stimulation lead, in accordance with an embodiment of the disclosure.

With additional reference to FIG. 1B, the electrodes 110 can be mounted or otherwise included on a distal end 112 of lead 104. In embodiments, electrodes 110 are comprised of a conductive material, (e.g., metal, etc.) configured to be positioned into direct contact with tissue of the patient. Electrodes 110 are operatively coupled with the neurostimulator device 102 through wires 114 comprised of conductive material that pass through the interior 116 of lead 104.

In some embodiments, the implantable lead 104 can include a plurality of electrodes 110 near distal end 112. For example, as depicted in FIG. 1B, the plurality of electrodes 110 includes ring electrodes 118 and 120, and segmented electrodes, such as segmented electrodes 122A, 122B, 124A, and 124B. While only segmented electrodes 122A, 122B, 124A, and 124B are shown, the segmented electrodes may form a discontinuous conductive ring that includes a plurality of electrodes, such as 122A, 122B, and an anterior electrode (not shown) for an exemplary ring of three segmented electrodes on one ring (collectively referred to as "segmented electrode ring"), and 124A, 124B, and an anterior electrode (not shown) on another ring (collectively referred to as "segmented electrode ring"). Each segmented electrode of a respective discontinuous segmented electrode ring is electrically isolated from the other segmented electrodes in the respective discontinuous segmented electrode ring. For example, segmented electrodes 122A and 122B, which are part of discontinuous segmented electrode ring, are electrically isolated from each other. In this example, there are two sets of three segmented electrodes forming segmented electrode rings and at distal end 112 of lead 104, such that each set of segmented electrodes forming segmented electrode rings and is aligned along a longitudinal axis of the electrode module and the sets are positioned circumferentially around outer perimeter of lead 104. At proximal end 126, the plurality of wires 114 can be in electrical communication with structures corresponding to a plurality of terminals 128 for ease in coupling to the neural stimulation device 102 and other medical and/or test equipment.

When measuring lead impedance in implantable systems with constant current stimulation systems, it can be difficult to measure high impedance broken leads. For example, when using short pulse width stimulation pulses (e.g., on the order of about 80 µs) the measurement can underestimate the true lead impedance due to a slow rise time to the pulse due to device capacitance; conversely, when using high pulse width stimulation to measure lead impedance, the measurement can overestimate the true impedance due to charging the electrode-tissue capacitance.

Applicants of the present disclosure have recognize that when a lead is broken, damaged or improperly positioned within the patient (e.g., a non-ideal tissue-electrode interface) then the lead model changes to a high impedance with a majority of the impedance being a pure resistive component. In such a scenario, the total impedance of the lead does not change significantly over the length of the delivered electrical pulse, as the reactive component of the total impedance, which is generally derived from the electrode-tissue interface, is no longer present. Using known features of the wave shapes for high impedance leads, a transfer function can be used to determine the resistive component of the load even with an operational lead and measuring the impedance at the end of a long pulse width, as long as the capacitive characteristics of the electrode-tissue interface are known or can be determined.

Figure 2A:
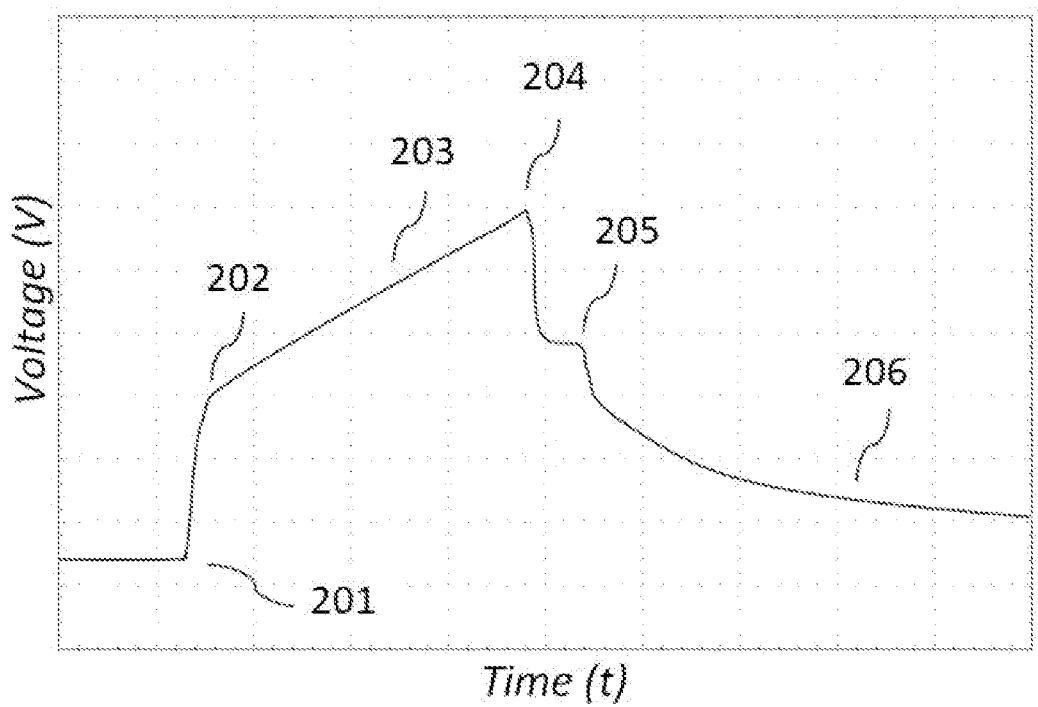
FIG. 2A is a voltage profile across one or more electrodes as a function of time for an individual pulse in a neurostimulation system with an intact lead system, in accordance with an embodiment of the disclosure.
Figure 2B:
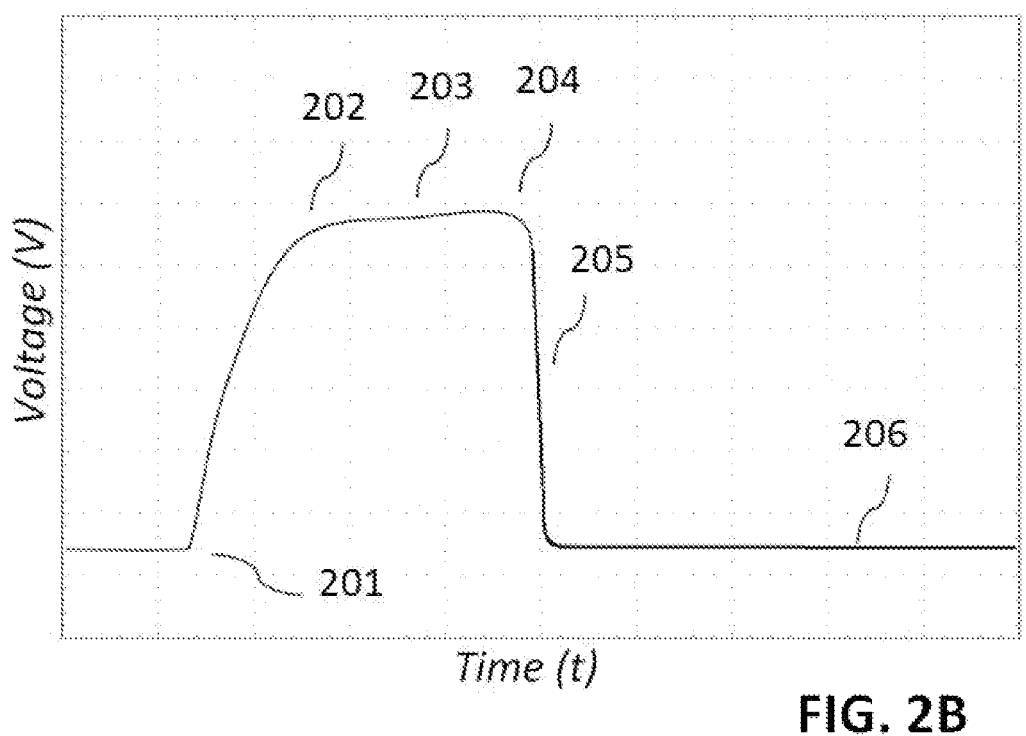
FIG. 2B is a voltage profile across one or more electrodes as a function of time for an individual pulse in a neurostimulation system with electrically separated or broken lead system, in accordance with an embodiment of the disclosure.

FIGS. 2A and 2B depict electrical waveforms that are generated by a neurostimulator through different load conditions. Total impedance Z for an implantable device is based on both a resistive component and a reactive component. A magnitude of the resistive component and of the reactive component will vary between leads 104 based upon a number of factors, for example, including a cross-section of the wires 114 leading to the electrodes 110, how those wires 114 are arranged, the shape and size of the electrodes 110, a general capacitance and inductance within the stimulation system 110, and an interface between the electrodes 110 and the tissue of the patient. The transition between these the resistive component in the reactive component of the total impedance is therefore based upon the particular system geometry. Total impedance can also be affected by filters (e.g., a bandstop filter configured to protect the device from electromagnetic interference) or other electronics in the system 100.

FIGS. 2A and 2B are representative plots of a measured voltage over the course of an individual pulse generated by a stimulation engine. In some embodiments, the stimulation engine can be an implantable neurostimulator device 102. In other embodiments, the stimulation engine can be test equipment used to test and overall condition and/or placement of the implantable lead 104, for example during surgical implantation of the lead 104 into a patient. Pulses delivered by the stimulation engine can be generated as a square wave (e.g., the signal is either on or off), but by the time electrical pulse reaches the electrodes 110 the electrical pulse can have significantly changed in shape as a result of a total impedance of the lead 104. The shape of the electrical pulse at the electrodes 110 (e.g., occasionally referred to herein as a "voltage wave shape," "voltage profile" or "waveform") can be indicative of the resistive and reactive components of a total impedance of the implantable stimulation lead 104.

As depicted in FIGS. 2A and 2B, at point 201, the stimulation engine has turned on and begun increasing the voltage at the electrode. Between point 201 and point 202, the impedance of the system is primarily resistive and relatively rapidly increases. Between point 202 and 203, the increase in voltage is an indication of the reactive component of the impedance (wherein the terms "reactive," "inductive," and "capacitive" components of the total impedance are referred to interchangeably).

In an embodiment, voltage of the system can be measured at each of the points 202, 203, and 204. As depicted in FIG. 2A, an increase in voltage from 202 to 203 and from 203 to 204 indicates characteristics of a system having a substantial reactive component of total impedance, which is characteristic of an intact lead with an ideal electrode-tissue interface. Conversely, as depicted in FIG. 2B, a relatively constant voltage from 202 to 203 and from 203 to 204 can indicate relatively low reactive component of total impedance, which is characteristic of a broken or defective lead, or a less than ideal electrode-tissue interface.

In various systems and environments, the slope of the line from 202 to 203 and from 203 to 204 can be non-linear. The wave shape can be affected by properties of the electrode-tissue interface or mechanical changes around the interface that affect proper contact (e.g., scar tissue, damaged tissue, fluid on the electrodes such as blood, air bubbles on the electrodes such as those caused by lead insertion, contact with epidural fat, or contact with fibrotic tissue formed around the electrode), compromised electrical insulation around the circuitry or leads, power supply limitations, or system malfunctions. In some systems, multiple voltage measurements can be taken along the waveform between points 202 and 204 to determine the wave shape more precisely. The timing of these measurements can be coordinated to determine which characteristics of the overall system are having an impact on the voltage wave shape.

At point 204, the stimulation pulse ends and voltage begins to drop. After the completion of the pulse, two voltage characteristics can be seen at points 205 and 206. Applicants of the present disclosure have recognized that point 205 can indicate when there is no active pulse occurring through the leads, and point 206 can indicate when the charge from the electrical pulse is being actively or passively reversed to match the charge that was delivered to the lead during the therapy pulse, and can be a result of impedance or capacitance of a variety of physical structures such as the leads, the housing, the electrode-tissue interface, and/or the circuitry of the stimulation engine.

In general, smaller electrodes tend to increase the impedance of the load, which in turn causes a slower rise time of the slope between 201 and 202. That is, the smaller the electrodes, the less point 204 will appear as a sharp corner. For example, an 80 µs pulse may not yet be stable for small electrodes (which can have surface areas down to about 0.2 $mm^2$ or less for some implantable devices, or for some neurostimulation embodiments surface areas in the range of 1-100 square-microns). Additionally, the characteristics of the electrode-tissue interface can change over time, such as during treatment or over time in an implanted device between treatments.

When measuring lead impedance in implanted systems with constant current stimulation systems it can be difficult to measure high impedance broken leads. When using short pulse width stimulation pulses on the order of 80 microseconds the measurement can underestimate the true lead impedance due to a slow rise time to the pulse due to device capacitance. Conversely, when using high pulse width stimulation to measure lead impedance, the measurement can overestimate the resistive component of the load due to the reactive components of the electrode-tissue interface and one or more capacitors positioned between the measurement circuitry and the lead. By measuring the voltage and current at various time intervals across the pulse, the reactive and resistive elements of an electrode system for delivering a therapy can be determined. Once the capacitive and resistive components of impedance are known, a transfer function can be determined that is predictive of the resistive component of the impedance regardless of where the measurement is taken along the pulse.

Figure 2C:
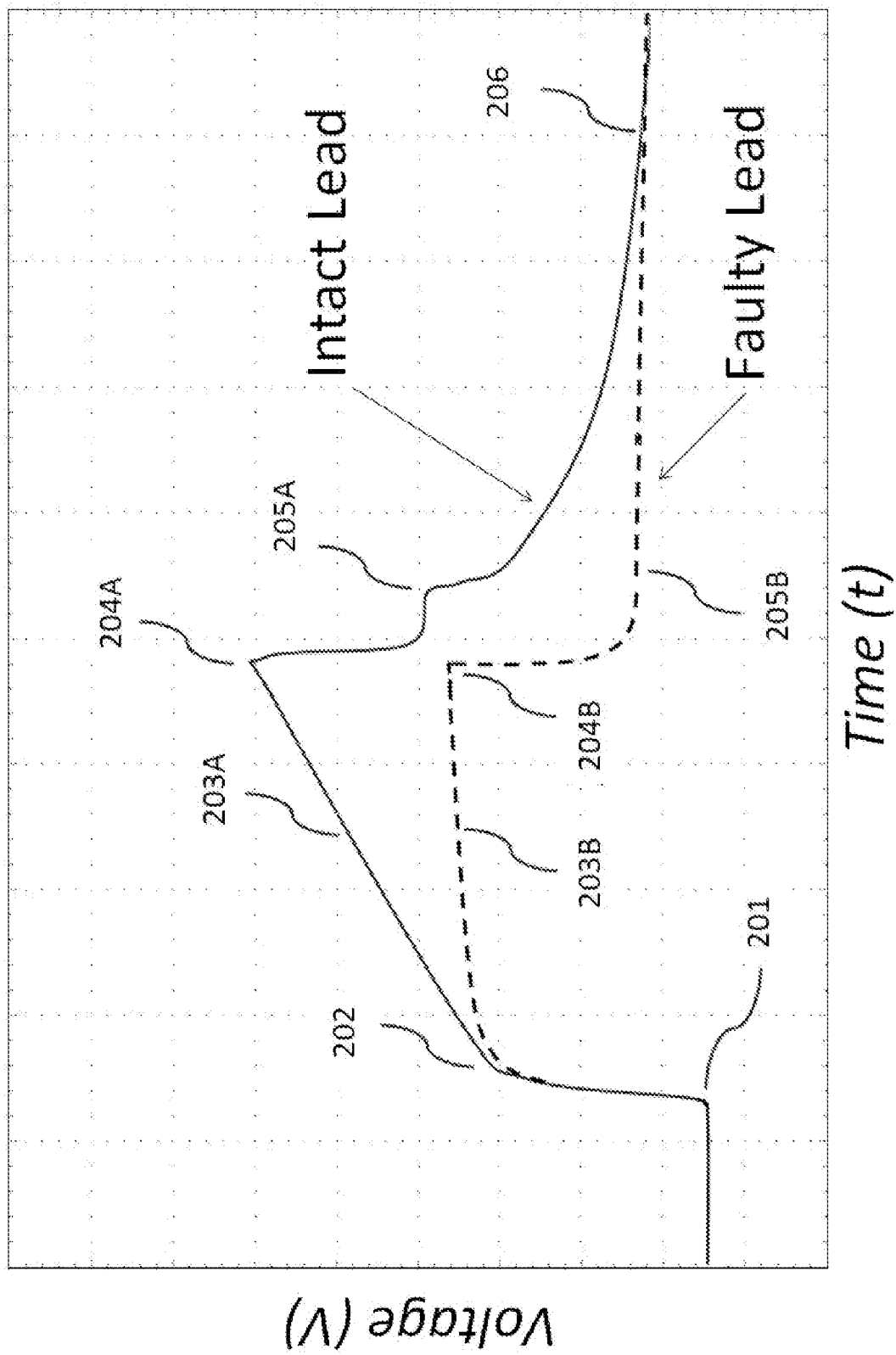
FIG. 2C is a graphical representation of a comparison of a voltage profile of an intact lead to a voltage profile that is either malfunctioning or improperly positioned within a patient, in accordance with an embodiment of the disclosure.

With additional reference to FIG. 2C, an overlapping comparison of a voltage wave shape having a substantial reactive component characteristic of an intact lead (e.g., referring to 203A, 204A, 205A, reflecting, for example, 203, 204, 205 of FIG. 2A, respectively), and a voltage wave shape having a relatively low reactive component, characteristic of a broken or defective lead, or a less than ideal electrode-tissue interface (e.g., referring to 203B, 204B, 205B, reflecting, for example, 203, 204, 205 of FIG. 2B, respectively), is depicted in accordance with an embodiment of the disclosure. To evaluate a series of detected voltages representing the voltage wave shape, the voltage wave shape can be compared to a model waveform (or one or more defined threshold values along the model waveform) representing an expected voltage at the same time during be electrical pulse to determine the presence of a fault condition.

Figure 3:
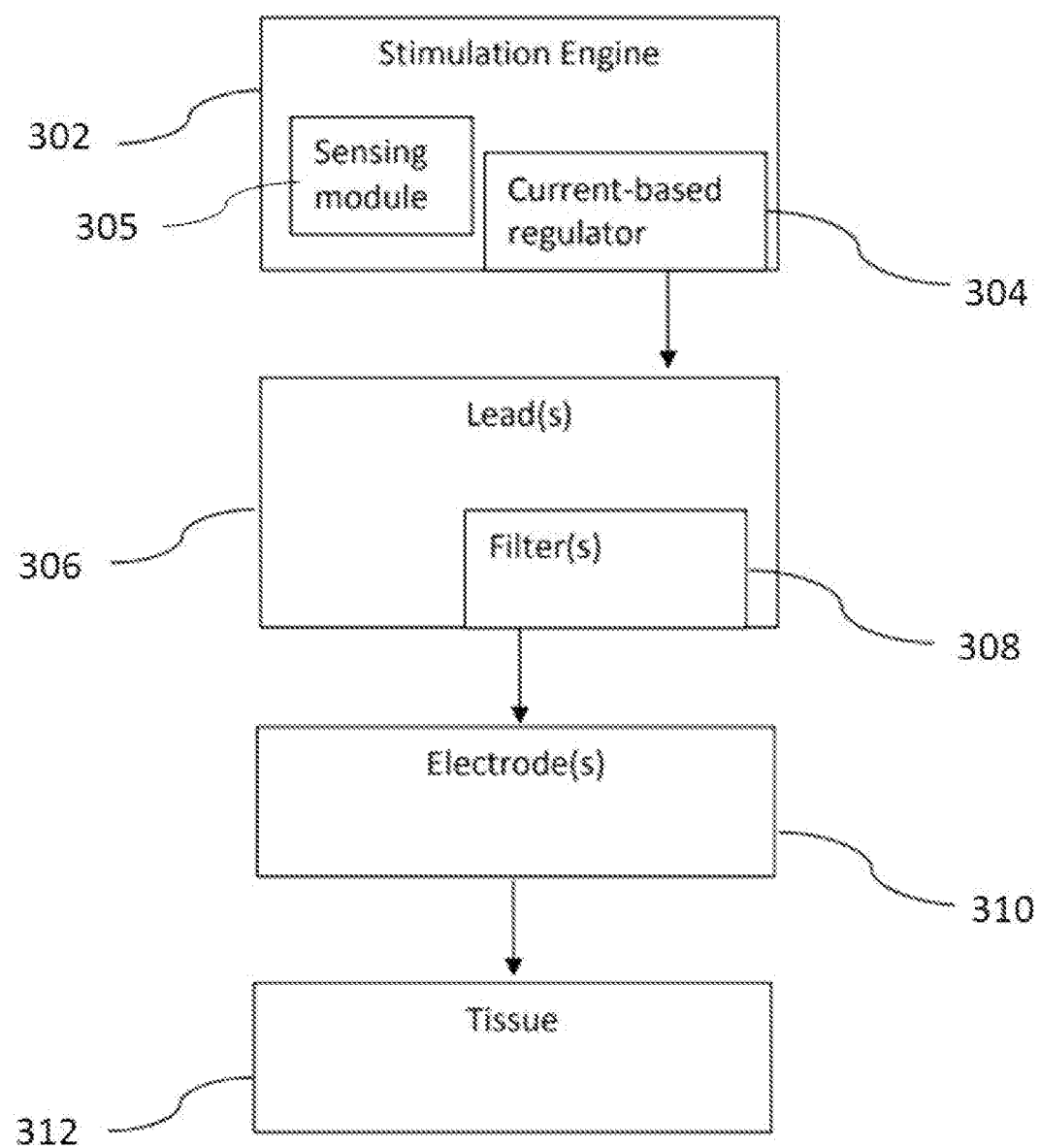
FIG. 3 is a schematic view of an electrical impedance measurement system, in accordance with an embodiment of the disclosure.

With additional reference to FIG. 3, a simplified diagram representing the path of an electrical pulse between the stimulation engine and an implantable lead is depicted in accordance with an embodiment of the disclosure. Stimulation engine 302 can include a current-based regulator 304 configured to provide an electrical signal to lead 306. Lead 306 can include one or more filters 308 configured to inhibit electromagnetic interference from adversely interacting with the leads 306 and creating unwanted signals. For example, in one embodiment, the filter 308 can be a bandstop filter to decouple the lead 306 and/or electronic components of the stimulation engine 302 from undesirable electromagnetic interference (EMI) signals at a selected frequency or across a range of frequencies, such as the RF pulsed fields of Magnetic Resonance Imaging (MRI) equipment.

Lead 306 delivers the electrical signal to electrodes 310. Stimulation engine 302 can further include a sensing module 305 configured to detect and characterize a load applied across the electrodes 310. As described above, the geometry and size of the electrodes 310 affects the reactive and resistive components of the total impedance. Additionally, the cross-section and length of the leads 306 as well as the size and geometry of the interface between electrodes 310 and tissue 312 can affect the reactive and resistive impedance of the overall system. Comparison of a sensed load applied across the electrodes 310 to an expected load can be helpful in identifying at least one of a broken, damaged or improperly positioned lead 306.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A medical device, comprising:
   a stimulation engine having a regulator configured to deliver electrical signals; and
   an implantable stimulation lead including at least two electrodes in electrical communication with the stimulation engine,
   wherein the stimulation engine is configured to—
      deliver an electrical pulse to the at least two electrodes using the regulator,
      detect two or more delivery voltages between the at least two electrodes at different times during delivery of the electrical pulse,
      compare at least one of the two or more delivery voltages to a defined threshold value, wherein the defined threshold value represents an expected delivery voltage at a corresponding time for the at least one of the two or more delivery voltages detected during the electrical pulse,
      determine whether a fault condition is present based on the comparison of the at least one of the two or more delivery voltages and the defined threshold value, and
      communicate the fault condition determination to an external programmer in wireless communication with the medical device.

2. The medical device of claim 1, wherein a detected voltage less than the defined threshold is indicative of the implantable stimulation lead being broken, damaged or improperly positioned.

3. The medical device of claim 1, wherein the stimulation engine is configured to obtain multiple voltage measurements at different times during a single electrical pulse delivery cycle.

4. The medical device of claim 1, wherein a timing of the two or more delivery voltages are coordinated to determine a voltage wave shape over the electrical pulse delivery cycle.

5. The medical device of claim 4, wherein characteristics of the wave shape are used to determine a resistive component and a reactive component of the implantable stimulation lead.

6. The medical device of claim 4, wherein characteristics of the wave shape are used to evaluate at least one of an electrode-tissue interface, compromised electrical insulation of the implantable stimulation lead, or power supply limitations associated with a power supply.

7. A method of identifying a fault condition in an implantable lead, comprising:

delivering an electrical pulse between at least two electrodes of the implantable stimulation lead using a regulator configured to deliver electrical signals;

detecting at least two or more delivery voltages between the at least two electrodes at different times during delivery of the electrical pulse;

comparing at least one of the two or more delivery voltages to a defined threshold value, wherein the defined threshold value represents an expected delivery voltage at a corresponding time for the at least one of the two or more delivery voltages detected during the electrical pulse;

determining whether a fault condition is present based on the comparison of the at least one of the two or more delivery voltages and the defined threshold value; and communicating the fault condition determination to an external programmer in wireless communication with the medical device.

8. The method of claim 7, wherein the electrical pulse is in the form of a square wave.

9. The method of claim 7, further comprising analyzing a total impedance of the implantable stimulation lead, including a resistive component and a reactive component.

10. The method of claim 7, wherein a timing of the detection of the two or more delivery voltages are coordinated to determine a voltage wave shape over the electrical pulse delivery, wherein the voltage wave shape is indicative of a resistive component and a reactive component of a total impedance of the implantable stimulation lead.

11. The method of claim 7, wherein a stimulation engine is configured to detect an initial voltage prior to delivery of the electrical pulse, and a first delivery voltage of the two or more delivery voltages, wherein a determined rate of change between the initial voltage and the first delivery voltage is indicative of a resistive component of a total impedance of the implantable stimulation lead.

12. The method of claim 11, wherein the stimulation engine is further configured to detect at least a second delivery voltage of the two or more delivery voltages, wherein a determined rate of change between the first delivery voltage and the second delivery voltage is indicative of a reactive component of the total impedance of the implantable stimulation lead.

13. The method of claim 12, wherein the stimulation engine is further configured to detect at least one final voltage after cessation of delivery of the electrical pulse, wherein the at least one final voltage is indicative of a reactive component of the total impedance of the implantable stimulation lead.

* * * * *